E. T. KIEN.
PUMP.
APPLICATION FILED DEC. 18, 1919.
1,355,231.
Patented Oct. 12, 1920.
2 SHEETS—SHEET 2.
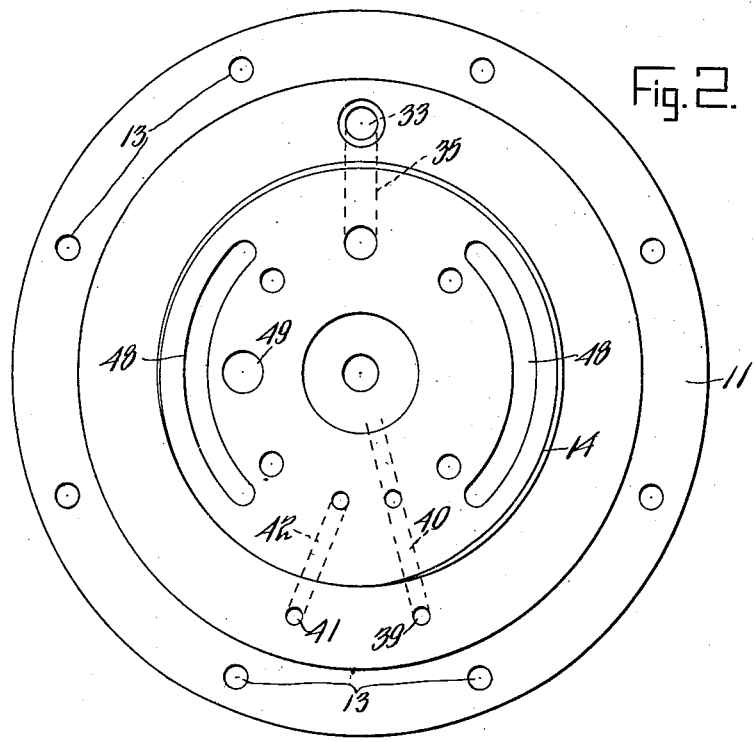
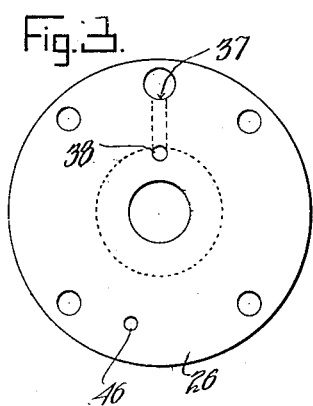
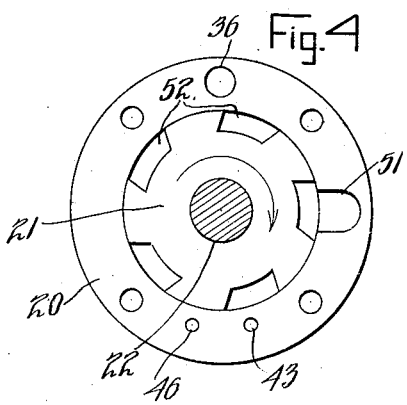
Inventor
Edward T. Kien
By Bradford Morrill Birman
Attorneys

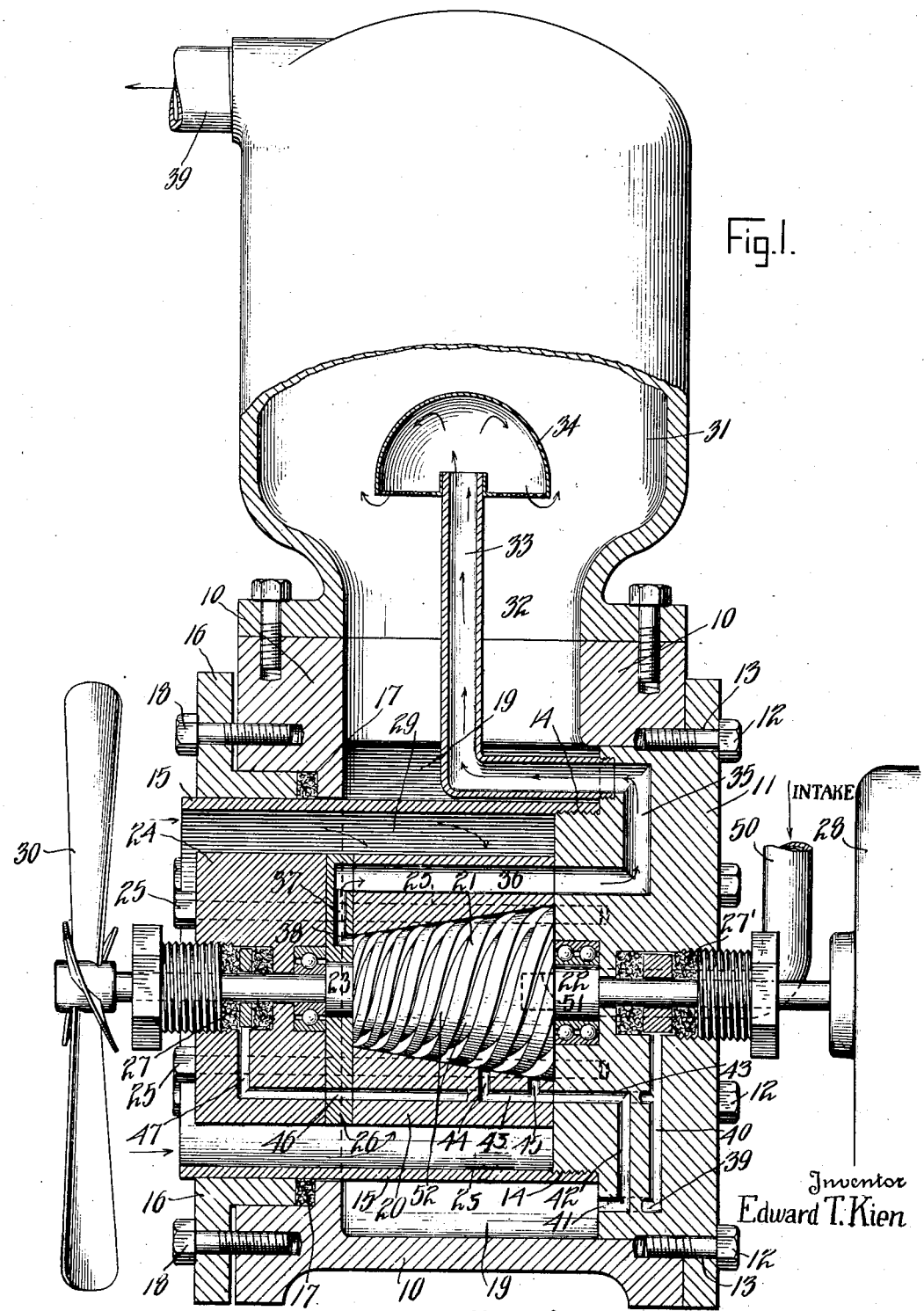

UNITED STATES PATENT OFFICE.

EDWARD T. KIEN, OF ELMHURST, ILLINOIS, ASSIGNOR OF ONE-HALF TO EMMETT S. NEWTON AND W. M. HARDWICK, BOTH OF CHATTANOOGA, TENNESSEE.

PUMP.

1,355,231.  Specification of Letters Patent.  Patented Oct. 12, 1920.

Application filed December 18, 1919. Serial No. 345,788.

*To all whom it may concern:*

Be it known that I, EDWARD T. KIEN, a citizen of the United States, residing at Elmhurst, in the county of Dupage and State of Illinois, have invented certain new and useful Improvements in Pumps, of which the following is a specification.

This invention relates to pumps, and while addressed especially to a pump adapted and intended for use in pumping gases as, for instance, in a refrigerating system, is not limited to such use and any explanation entered into, in this specification, in terms of refrigeration or the pumping of gas is only explanatory and not limiting upon the scope of the invention.

An object of the invention is to provide a conical rotating piston having helical, inclined and progressively decreasing carrying-furrows with means for driving the conical piston and means for supplying a film of lubricant entirely about said piston to prevent friction and wear, and form a seal between the piston and casing.

With these and other objects the invention comprises certain novel units and elements, and combinations of units and elements as will be hereinafter more fully described and claimed.

Referring to the accompanying drawings, which are made a part hereof, and on which similar reference characters indicate similar parts, Figure 1 is a view of the pump largely in vertical section, diametrically through the pump chamber, with the compression chamber shown in section, Fig. 2 is a view in elevation of the interior of the pump head, Fig. 3 is a view in elevation of the interior of the head at the smaller end of the conical piston, and Fig. 4 is a view in elevation of the piston and housing member.

The improved pump, which forms the subject matter of this application, comprises a base 10 having rigidly secured at one end thereof pump head 11 in any approved manner as by the use of the bolts 12, and holes 13, by which combined means a tight joint with the base 10 is secured. The head 11 has a reduced threaded annulus 14 with a cylindrical casing 15 secured thereto at the threaded joint and further retained by the follower 16 and packing 17 with the tension screws 18. The follower 16, engaging as it does against the exterior of the tubular housing 15, serves to maintain such housing properly centered relative to the base 10 and the head 11 forming a chamber 19 entirely around the tubular housing 15 within the base 10.

Within the tubular housing 15 a piston housing 20 is provided, having a tapered bore within which the tapered piston 21 is mounted to rotate. The journaling of the piston 21 is by means of a bearing 22 in the head 11 and a bearing 23 in a block 24 secured to the head 11 by bolts 25 with a tail block 26 interposed between the block 24 and the housing member 20 and through which the axis of the piston 21 extends. Suitable packing glands 27 and 27' are provided to maintain the bearings of the cylinder in gas tight relation, and the piston is driven in any approved manner as directly from the motor 28.

The interval between the combined blocks 20, 24 and 26 upon the one hand and the tubular housing 15 upon the other hand, produces a chamber 29 entirely surrounding the piston and positioned to receive air set in motion by the fan 30 preferably carried directly upon the shaft of the piston.

Above the base 10 a compression chamber 31 is erected in communication through the opening 32 with the chamber 19 surrounding the tubular member 15. Into the compression chamber 31 extends the pipe 33 for inducting the compressed gas into the compression chamber, a baffle 34 being provided to deflect any oil or other heavy fluid which may be discharged through the pipe 33. The pipe 33 communicates with a passage 35 in the head 11 which in turn communicates with the passage 36 in the piston casing member 20 and that again in turn communicates with a passage 37 in the tail block 26 which has a port 38 in position to receive the compressed gases from the piston and conduct them through the combined passages 37, 36 and 35 into and through the pipe 33 into the compression chamber from where they are discharged, as through the pipe 39. The chamber 19 in communication with the compression chamber 31 is, as stated, in position to receive oil deflected by the baffle 34 and such oil is employed for lubricating the parts by forming a canal 39 in communication with such chamber having a conduit 40 extending upwardly to the gland 27′. A second canal 41 communicates with the conduit 42 in the head 10 which in turn communicates with the conduit 43 in the member 20 with branches 44 and 45 conducting lubricant to the exterior of piston 21 to both lubricate and form a seal. The conduit 40 also communicates through the perforation 46 in the tail block 26 with the conduit 47 in the block 44 which conduit communicates with the gland 27. In addition to being provided with passages 35, 40 and 42, the head block 11 is provided with segmental openings 48 communicating with the chamber 29 so that the air injected into such chamber 29 by the fan 30 will find egress through the segmental openings 48 cooling in its passage the piston housing 20 and other parts upon which it impinges. It is also provided with an inlet passage 49 in communication with the intake pipe 50 and also in communication with the port 51.

The port 51 as will be noted, especially from Fig. 4, is formed in the wall of the piston housing and is in communication with the peripheral surface of the piston adjacent its larger end or conical base. The piston is provided about its periphery with a plurality of furrows 52, such furrows decreasing in width as they approach the smaller end or apex of the conical piston and also the intervening ribs decreasing in width thereby the carrying capacity of the piston decreases, not only from its decreased diameter but by reason of the constricting of the furrows. The formation of the furrows 52 is such as to produce undercuts on the forward sides of the ribs, as indicated more particularly at Fig. 4, so that the gas at the inlet port is presented with a comparatively sharp or chisel edge of the rib as the piston is driven.

In operation the piston 21 and fan 30, carried by the same shaft, are driven in any approved manner as from the motor 28, it being understood that the motor is shown only as a convenient means of driving without in any way limiting the operation of the device thereby. The fluid being acted upon is introduced through the intake pipe 50 through the passage 49 and port 51 into engagement with the periphery of the rapidly rotating piston by the spiral formation of which and the decreasing carrying capacity the gas is moved toward the apex or smaller end and compressed, being discharged through the port 38, the passages 37, 36, 35 and 33 into the compression chamber 31. The maintaining of the compression in the compression chamber 31 forces the lubricant contained in the chamber 19 upwardly through the several passages into lubricating relation to the journals of the shaft and the exterior surfaces of the piston, which also serves to draw the lubricant upwardly as it rotates, whereby the parts are maintained in lubricated and sealed condition. It follows, therefore, that lubricant being applied to the exterior surfaces of the piston, the gases being compressed by the piston and discharged into the compression chamber 31, will carry therewith certain amount of the lubricant which is deflected by the baffle 34 and returned to the chamber 19.

Having thus fully described my said invention, what I claim as new and desire to secure by Letters Patent is:

1. In a pump a conoidal piston provided with helical peripheral furrows decreasing in width from the base to the apex, a casing having a tapered bore embracing the conoid and with outlet port and inlet port at the apex and base of the conoid respectively.

2. In a pump a conoidal piston provided with helical peripheral furrows decreasing in width and approaching each other from the base to the apex, a casing provided with a tapered bore seating the conoid and provided with an outlet port at the apex and an inlet port at the base.

3. In a pump a conoidal piston provided with helical peripheral furrows the walls of which approach each other from base to apex, a casing having a tapered bore seating the conoid and provided with an outlet port at the apex and an inlet port at the base.

4. In a pump a conoidal piston provided with helical peripheral furrows the walls of which approach each other from base to apex, a casing provided with a tapered bore seating the conoid and provided with an outlet port at the apex and an inlet port at the base communicating with the periphery of the conoid.

5. In a pump a conoidal piston provided with helical peripheral furrows decreasing in width and approaching each other from the base to the apex, a casing provided with a tapered bore seating the conoid and provided with an outlet port at the apex and an inlet port at the base.

6. In a pump a conoidal piston provided with helical peripheral furrows decreasing in width and approaching each other from the base to the apex, and a casing provided with a tapered bore seating the conoid and provided with an outlet port at the apex and inlet port at the base communicating with the periphery of the conoid.

7. In a pump a conoidal piston provided with helical peripheral furrows decreasing in width and approaching each other from the base to the apex, said furrows being wider at the bottom than at the periphery forming an undercut in one side of the intervening ribs presenting an acute-angled advance edge on the rib as the piston rotates.

8. In a pump a conoidal piston provided with helical peripheral furrows decreasing in width and approaching each other from base to apex and narrower at the bottom than at the periphery presenting an acute-angled advance edge on the intervening ribs as the piston rotates, a casing provided with a tapered bore seating the piston and provided with a discharge orifice at the apex and an inlet orifice at the base communicating with the periphery of the piston.

9. In a pump a rotary piston, a piston casing embracing and forming a bearing for the piston, a lubricant-containing housing surrounding the casing and spaced therefrom producing an interval between the casing and the lubricant chamber open at opposite ends, and a fan mounted adjacent to one open end, and means to operate the fan to force air through the interval between the lubricant chamber and the casing and into cooling engagement with the casing.

10. In a pump, a rotating piston, a casing for the piston, a housing surrounding the casing and providing a space, a partition disposed within the housing dividing the space into an external lubricant containing space and an internal cooling chamber and means to force air into the cooling chamber into engagement with the housing and the partition forming a part of the lubricant containing chamber.

11. In a pump, a piston casing, a cooling chamber surrounding the casing, a lubricant chamber surrounding the cooling chamber and means to force air into the cooling chamber.

In witness whereof I have hereunto set my hand and seal at Washington, D. C., this 16th day of December, A. D. nineteen hundred and nineteen.

EDWARD T. KIEN. [L. S.]

Witness:
    E. W. BRADFORD.